United States Patent
Rabinovich et al.

(10) Patent No.: US 11,100,287 B2
(45) Date of Patent: Aug. 24, 2021

(54) CLASSIFICATION ENGINE FOR LEARNING PROPERTIES OF WORDS AND MULTI-WORD EXPRESSIONS

(71) Applicant: International Business Machines Corporation, Armonk, NY (US)

(72) Inventors: Ella Rabinovich, Haifa (IL); Benjamin Sznajder, Jerusalem (IL); Artem Spector, Shefayim (IL); Ilya Shnayderman, Jerusalem (IL); Ranit Aharonov, Ramat Hasharon (IL); David Konopnicki, Haifa (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/174,819

(22) Filed: Oct. 30, 2018

(65) Prior Publication Data

US 2020/0134020 A1    Apr. 30, 2020

(51) Int. Cl.
*G06F 40/30* (2020.01)
*G06N 20/00* (2019.01)
(Continued)

(52) U.S. Cl.
CPC ............ *G06F 40/30* (2020.01); *G06F 16/337* (2019.01); *G06F 16/35* (2019.01); *G06N 20/00* (2019.01)

(58) Field of Classification Search
CPC ..................................................... G06F 16/35
(Continued)

(56) References Cited

U.S. PATENT DOCUMENTS 9,899,019 B2     2/2018  Bellegarda et al.
2004/0249628 A1* 12/2004  Chelba ................. G06F 40/216
                                                                704/4
(Continued)

FOREIGN PATENT DOCUMENTS

CN      102682130 A    9/2012
CN      105787461 A    7/2016
(Continued)

OTHER PUBLICATIONS

Z. Z. Wint, Y. Manabe and M. Aritsugi, "Deep Learning Based Sentiment Classification in Social Network Services Datasets," 2018 IEEE International Conference on Big Data, Cloud Computing, Data Science & Engineering (BCD), Yonago, Japan, 2018, pp. 91-96, doi: 10.1109/BCD2018.2018.00022. (Year: 2018).*

(Continued)

*Primary Examiner* — Bharatkumar S Shah
(74) *Attorney, Agent, or Firm* — Gero G. McClellan

(57) ABSTRACT

Method and apparatus for training and using a classifier for words. Embodiments include receiving a first plurality of sentences comprising a first word that is associated with a class and a second plurality of sentences comprising a second word that is not associated with the class. Embodiments include training a classifier using positive training data for the class that is based on the first plurality of sentences and negative training data for the class that is based on the second plurality of sentences. Embodiments include determining a measure of correlation between a third word and the class by using a sentence comprising the third word as an input to the classifier. Embodiments include using the measure of correlation to perform an action selected from the following list: selecting content to provide to a user; determining an automatic chat response; or filtering a set of content.

20 Claims, 6 Drawing Sheets

(51) Int. Cl.
*G06F 16/35* (2019.01)
*G06F 16/335* (2019.01)

(58) Field of Classification Search
USPC .......................................................... 704/9
See application file for complete search history.

(56) References Cited

U.S. PATENT DOCUMENTS

| | | | |
|---|---|---|---|
| 2015/0058018 A1* | 2/2015 | Georges | G10L 15/08 |
| | | | 704/257 |
| 2016/0099892 A1* | 4/2016 | Palakovich | H04L 51/02 |
| | | | 709/206 |
| 2018/0060302 A1* | 3/2018 | Liang | G06F 40/289 |
| 2018/0322188 A1 | 11/2018 | Zhou et al. | |

FOREIGN PATENT DOCUMENTS

| | | | |
|---|---|---|---|
| CN | 107943792 A | * | 4/2018 |
| CN | 108388608 A | | 8/2018 |
| WO | 2017075017 A1 | | 5/2017 |

OTHER PUBLICATIONS

J. Winkler and A. Vogelsang, "Automatic Classification of Requirements Based on Convolutional Neural Networks," 2016 IEEE 24th International Requirements Engineering Conference Workshops (REW), Beijing, China, 2016, pp. 39-45, doi: 10.1109/REW.2016.021. (Year: 2016).*

Akhtar et al., "Unsupervised Morphological Expansion of Small Datasets for Improving Word Embeddings," arXiv:1711.05678v1 [cs.CL] Nov. 15, 2017, 14 pages.

Shutova et. al., "Multilingual Metaphor Processing: Experiments with Semi-Supervised and Unsupervised Learning," Submission received: Sep. 28, 2015; Revised version received: Feb. 19, 2016; Accepted for publication: May 29, 2016. 54 pages.

Paul McNamee, Charles k. Nicholas and James Mayfiled, "Addressing Morphological Variation in Alphabetic Languages," Published 2009 in SIGIR, • DOI:10.1145/1571941.1571957, 1 page.

PCT Notification of Transmittal of the International Search Report and The Written Opinion of the International Searching Authority, or the Declaration for Applicaoni No. PCT/IB2019/059160 dated Feb. 7, 2020.

* cited by examiner

CLASSIFICATION ENGINE FOR LEARNING PROPERTIES OF WORDS AND MULTI-WORD EXPRESSIONS

BACKGROUND

The present disclosure relates to classifying words and expressions, and more specifically, to techniques for training a classifier to determine a measure of similarity between a word or expression and a class based on sentences that include the word or expression.

The influence of psycholinguistic properties of words on cognitive processes has become a major topic of scientific inquiry in recent decades. Among the most studied psycholinguistic classes are abstractness, concreteness, familiarity, imagery, and average age of acquisition. Abstractness, for example, evaluates the degree to which a concept denoted by an expression refers to an entity that cannot be directly perceived by human senses. Determining psycholinguistic classes of words and expressions is often useful in artificial intelligence (AI) contexts, such as dynamically responding to text entered by a user (e.g., by a chatbot). Furthermore, psycholinguistic classes of words and expressions are also useful in determining types of content to provide to users of application. For instance, paragraphs that are "anecdotal" (e.g., containing short accounts of real incidents or people) generally include more words or phrases that could be classified as concrete rather than abstract. As such, understanding whether words are abstract or concrete may be useful in automatically selecting content (such as anecdotal content) for users under particular circumstances.

Due to its inherent costs, the manual determination of psycholinguistic properties or classes typically results in the creation of datasets of limited size, and is therefore of limited utility. As such, there is a need in the art for improved methods of determining psycholinguistic properties or classes of words and phrases.

SUMMARY

According to one embodiment of the present invention, a method includes receiving a first plurality of sentences comprising a first word that is associated with a class and a second plurality of sentences comprising a second word that is not associated with the class. In some embodiments, the method further includes training a classifier using positive training data for the class that is based on the first plurality of sentences and negative training data for the class that is based on the second plurality of sentences. In some embodiments, the method further includes determining a measure of correlation between a third word and the class by using a sentence comprising the third word as an input to the classifier. In some embodiments, the method further includes using the measure of correlation to perform an action selected from the following list: selecting content to provide to a user; determining an automatic chat response; or filtering a set of content. In certain embodiments, a computing system may be configured to perform methods described herein. In some embodiments, a non-transitory computer-readable medium may store instructions that, when executed by one or more processors, cause the one or more processors to perform methods described herein.

DETAILED DESCRIPTION

Figure 1:
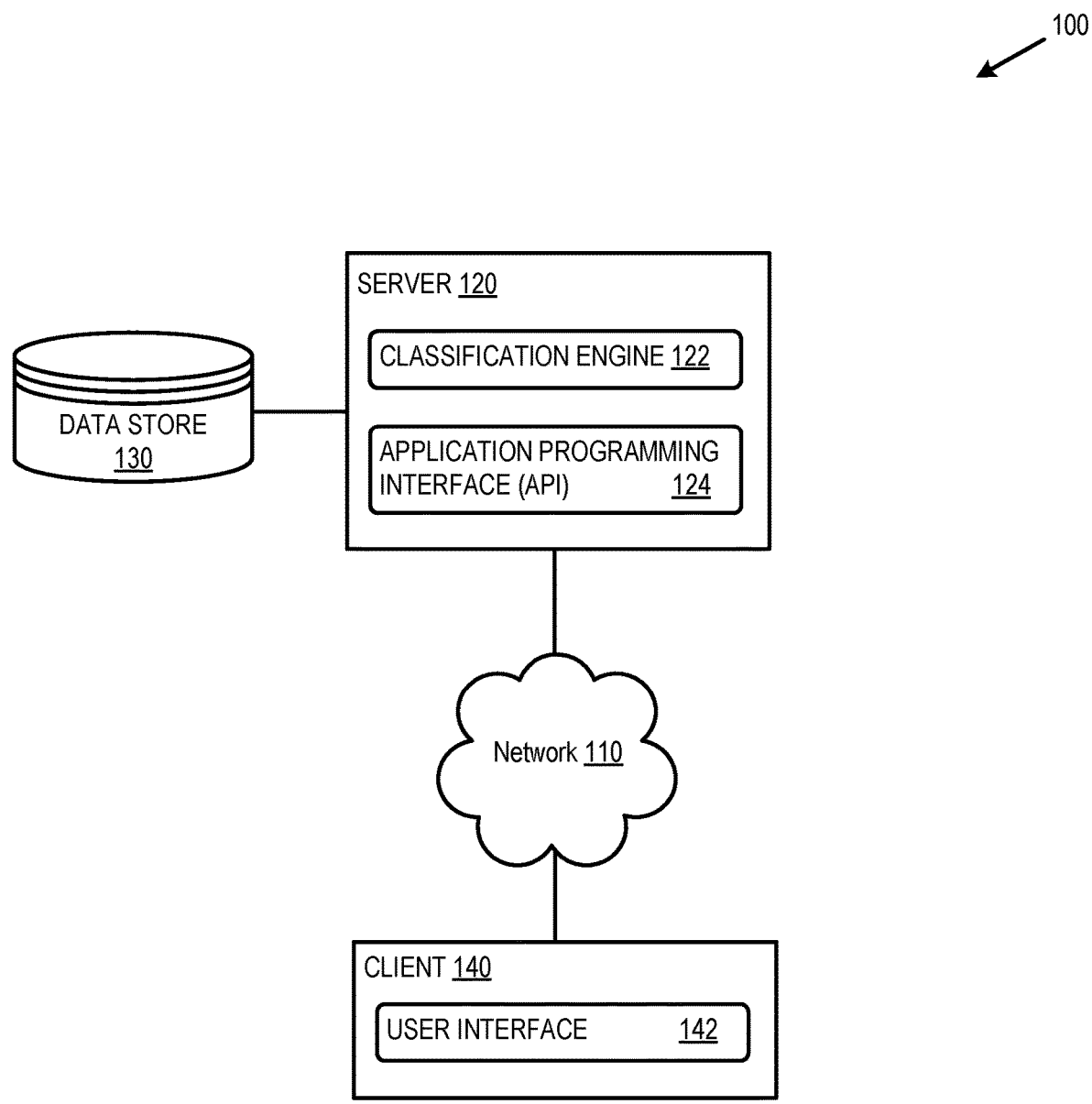
FIG. 1 depicts a computing environment in which embodiments of the present disclosure may be implemented.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

FIG. 1 depicts a computing environment 100 in which embodiments of the present disclosure may be implemented. Computing environment 100 includes a server 120 and a client 140 connected via a network 110. Network 110 may include any type of connection that allows for the exchange of data between server 120 and client 140, such as a local area network (LAN), intranet, cellular data network, the Internet, or the like.

Server 120 is generally representative of a computing device such as a physical or virtual server, desktop computer, or other computing device. Server 120 comprises a classification engine 122, which generally performs operations related to classifying words and phrases, and an application programming interface (API) 124, which generally serves as an interface through which users (e.g., of client 140) interact with services provided by server 120, such as classification engine 122. Server 120 is connected to a data store 130, which generally represents a data storage entity (e.g., database, repository, or the like) that stores content such as text (e.g., including sentences) used in classifying words and phrases according to embodiments of the present disclosure. Content in data store 130 may be unlabeled data, meaning that is has not necessarily been reviewed by a human, and may not be associated with labels or other metadata. It is noted that, while data store 130 is depicted separately from server 120, data store 130 may alternatively be included within server 120.

Client 130 is generally representative of a computing device such as a mobile phone, laptop computer, desktop computer, tablet, or the like. Client 130 comprises a user interface 132, which allows a user to provide input and receive output (e.g. via a display associated with client 130). In some embodiments, user interface 132 allows a user to interact with classification engine 122 of server 120 through API 124 (e.g., via API method calls). It is noted that, while user interface 132 is depicted as a component of client 140, user interface 132 may alternatively be located on server 120.

According to embodiments, classification engine 122 trains a classifier to determine a measure of similarity between a word or phrase and a class. For example, the classifier may be trained to output a score indicating a strength of association between a word or phrase and the class of abstractness based on one or more sentences that include the word or phrase that are provided to the classifier as input. In certain embodiments, the classifier is trained using a plurality of sentences that include a word known or inferred to be associated with the class and a plurality of sentences that include a word known or inferred to not be associated with the class. The classifier is trained to recognize semantic indicators of a class within a sentence, such as prefixes, suffixes, combinations of words and/or phrases, and the like. For example, the suffixes "ism" and "ness" are often associated with the class of abstractness (e.g., because words like happiness and existentialism represent abstract concepts), and the presence of these suffixes in a sentence is an indicator that the sentence includes abstract words or phrases. Furthermore, the classifier is able to determine an abstractness of a previously unclassified word or phrase based on the lexical neighborhood (e.g., nearby words and grammatical structure in a sentence) of the word or phrase in one or more sentences, as the classifier is trained based on historical lexical neighborhoods of words or phrases known or inferred to be abstract or not abstract.

Embodiments of the present disclosure involve the use of a classifier, which may be implemented using various machine learning techniques. For example, a classifier according to certain embodiments may include a naïve Bayes classification model, a bidirectional recurrent neural network (RNN), a nearest neighbor algorithm, or another type of classification model. Machine learning models are generally trained using a training data set that includes training inputs that are associated with particular training outputs. For example, certain features that are historically associated with a particular output in a data set are used to train the model.

In one embodiment, classification engine 122 trains a classifier for the class of abstractness. Classification engine 122 retrieves a first group of sentences that each include a first pre-classified word identified as being associated with the class of abstractness, such as "utilitarianism", from data store 130. Classification engine 122 then retrieves a second group of sentences that each include a second pre-classified word identified as being associated with the class of concreteness, such as "dog", from data store 130. A word may be pre-classified or identified as being associated with a class based on manual input from a user or, in some embodiments, based on automatic inferences. For example, the word utilitarianism may be automatically inferred to be associated with the class of abstractness based on its suffix (e.g., which may be stored in a dictionary of suffixes indicating abstractness). Data store 130 may, for example, store textual content (e.g., encyclopedia data, scholarly articles, and the like) that can be queried for sentences that include particular words or phrases. The first group of sentences is used as positive training data (e.g., to train the classifier for recognizing the class of abstractness) and the second group of sentences is used as negative training data (e.g., to train the classifier to recognize non-indicators of abstractness, such as indicators of concreteness). Training the classifier may, in some instances, involve "featurizing" the sentences by extracting features from each sentence. Features may be prefixes, suffixes, words, phrases, combinations of words, numbers of words, proximities of words to the pre-classified words (e.g., utilitarianism and dog), and the like. Features may be extracted through semantic analysis of the sentences, such as using nearest neighbor algorithms. In some embodiments, non-alphabetic words and words including special characters are filtered out or otherwise not included in the features. Features extracted from the first group of sentences are used as positive training data, while features extracted from the second group of sentences are used as negative training data. Generation of positive and negative training data may be described as generating "weakly labeled" data, as the training data is not manually labeled by users, but is associated (or labeled) with a class based on automatic lexical analysis. The training process may thus be described as a weakly supervised training process.

Once trained, the classifier is able to determine a measure of correlation between a given input data set, such as one or more sentences that include a word, and the class of abstractness. In one embodiment, a user of client 140 specifies a word to be classified, such as through input to user interface 142, and client 140 transmits a request to classify the word to classification engine 122, such as via a call to a method of API 124. Classification engine 122 retrieves a group of sentences from data store 130 that each include the word to be classified. In some embodiments, classification engine 122 extracts features from the group of sentences, such as through lexical analysis of the group of sentences, and provides the features as inputs to the classifier. In other embodiments, classification engine 122 provides the group of sentences directly as an input to the classifier, and the classifier identifies features in the group of sentences. The classifier outputs a measure of correlation between the group of sentences and the class of abstractness. For example, in certain embodiments, the classifier outputs a score that indicates a strength of association between the group of sentences and the class. Classification engine 122 determines a measure of correlation between the word to be classified and the class of abstractness based on the output from the classifier. The measure of correlation is then provided by classification engine 122 back to user interface 142, such as via a response to the request sent from client 140 via API 124.

The classifier may use a nearest neighbor algorithm, such as a radius-based algorithm, to determine the measure of correlation. In one example, the measure of correlation is defined by a majority vote of the neighboring words or phrases of the word to be classified in sentences, where a neighboring words or phrase is only considered if it is above a similarity threshold with respect to a word or phrase included in the training data. For example, the abstractness score of the word to be classified may be computed as the ratio of its abstract neighbors to the total number of concepts within the considered proximity (e.g., within a specified distance of the word to be classified in a given sentence). Multi-word phrases may be subject to more careful processing. For example, the classifier may compute an abstractness score for a multi-word phrase as an average of its individual words' abstractness scores. In some embodiments, the classifier comprises a bidirectional recurrent neural network (RNN) with one layer of forward and backward long short-term memory (LSTM) cells. In other embodiments, the classifier may comprise a simple probabilistic Naive Bayes (NB) classifier, with a bag-of-words (BoW) extracted from the positive and negative training data as a feature set. Signals of abstractness may be manifested by the immediate lexical neighborhood of a word or phrase (as reflected by sentences containing the word or phrase). The measurement of correlation (e.g., abstractness score) of the word to be classified is therefore defined in some embodiments as the posterior probability determined by the classifier.

Once the measure of correlation is provided to client 140, it may be used in a variety of different ways. For example, the measure of correlation may be provided to the user via user interface 142. In another example, the measure of correlation is used as part of another process. For instance, a user may interact with a support chatbot via user interface 142, and the measure of correlation may be used by the support chatbot to determine an appropriate automatic char response to the user based on the user's usage of the word. A word with a high abstractness score may, for example, be an indicator that the support chatbot should transfer the conversation to a live support agent, as the user's problem may be too complex to be handled by the chatbot. In another example, the measure of correlation is used to determine an age of the user. Words with higher abstractness scores may, for instance, be used more commonly by older users than by younger users. As such, different content may be provided to a user based on the abstractness of the words used by the user. Furthermore, abstractness scores may be used to determine an extent to which a given set of text is "anecdotal", as anecdotal content generally includes more concrete words and fewer abstract words. As such, abstractness scores can be used to identify anecdotal content to provide to users.

It is noted that abstractness is only included as an example of a class, and that techniques described herein may be used to determine associations between words or phrases and any type of class. Other types of classes may include, for example, controversy, sentiment, and factuality. It is understood that the ability to recognize these classes in unlabeled content may be useful for a variety of purposes, such as filtering content and selecting content to provide to users under particular circumstances.

Embodiments of the present disclosure constitute an improvement over conventional techniques for classifying words or phrases, such as manual classification or automatic classification based on manually labeled training data. The ability to automatically derive training data from an unlabeled data set allows a classifier to be trained more efficiently with significantly larger amounts of training data, and therefore improves the functioning of the classifier. Furthermore, using an existing unlabeled data set to train a classifier substantially reduces the time and resources required to train a classifier. The ability to automatically determine a measure of correlation between a word or phrase and a class based on a weakly-supervised machine learning process allows for improved automatic determinations, such as automatically selecting content to provide to users, filtering content, providing automated customer support, and identifying user characteristics such as age or level of expertise.

Figure 2:
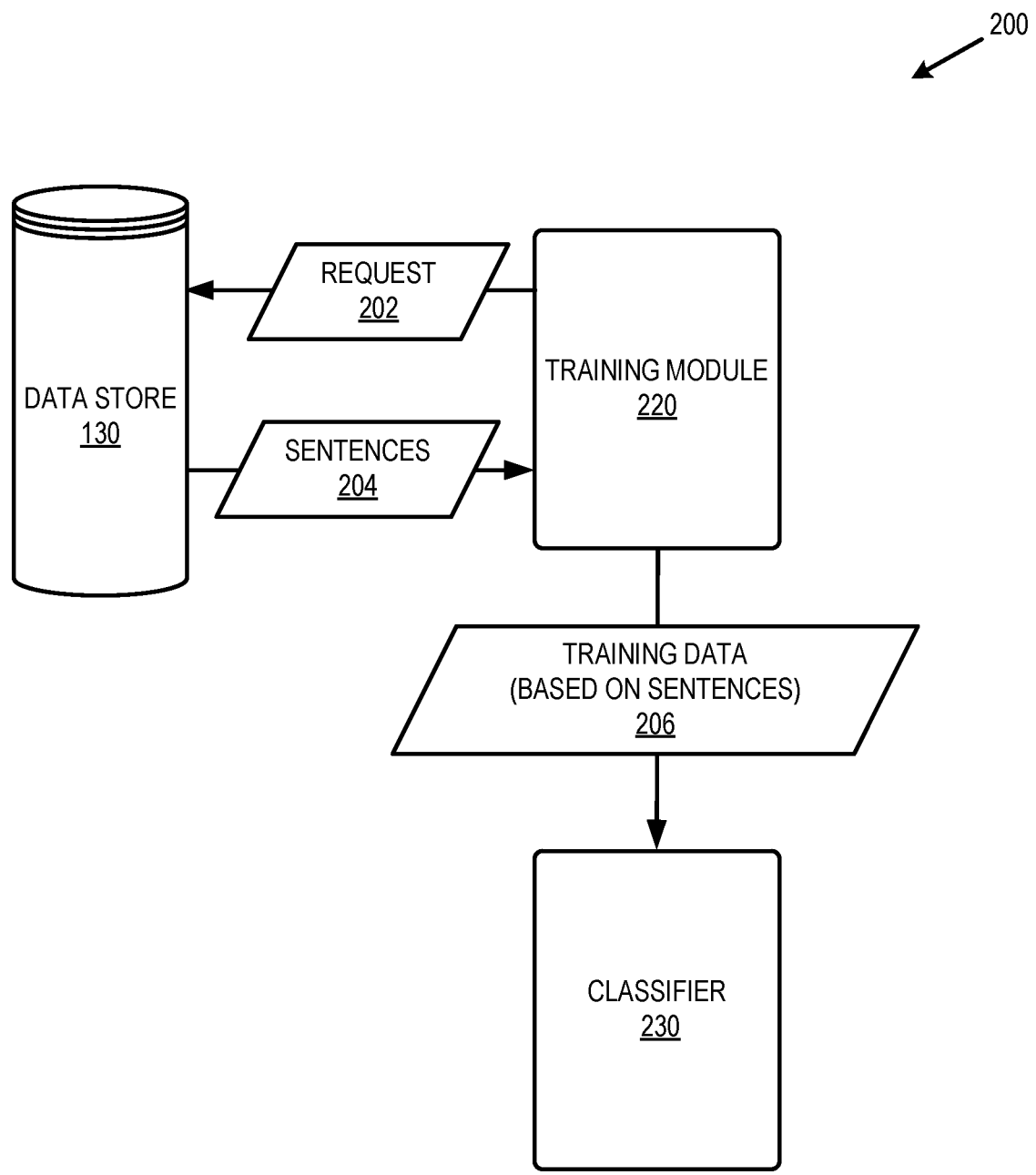
FIG. 2 depicts an exchange of data between components related to training a classifier according to embodiments of the present disclosure.

FIG. 2 depicts an example 200 of an exchange of data between components related to training a classifier according to embodiments of the present disclosure.

Training module 220 generally performs operations related to training classifier 230. Training module 220 and classifier 230 may represent components of classification engine 122 of FIG. 1. Data store 130 represents data store 130 of FIG. 1.

In example 200, training module 220 sends a request 202 to data store 130 for sentences including particular words. In one embodiment, request 202 is a query that specifies a first word identified as being associated with a class (e.g., abstractness) and a second word identified as not being associated with the class (e.g., the second word may be associated with an opposite class of the class, such as concreteness). In response to request 202, data store 130 sends sentences 204 to training module 220. Sentences 204 include a first group of sentences that each include the first word and a second group of sentences that each include the second word. Training module 220 uses the first group of sentences to generate positive training data for the class and the second group of sentences to generate negative training data for the class. For example, training module 220 may perform lexical analysis of each of the sentences to determine features that are indicators or non-indicators of the class (e.g., features of the first group of sentences are indicators of the class and features of the second group of sentences are non-indicators of the class).

Training module 220 trains classifier 230 using training data 206, which includes the positive training data and the negative training data. For example, classifier 230 may be a bidirectional recurrent neural network (RNN) comprising a radius-based nearest neighbor algorithm or may be a Naïve Bayes classifier.

Figure 3:
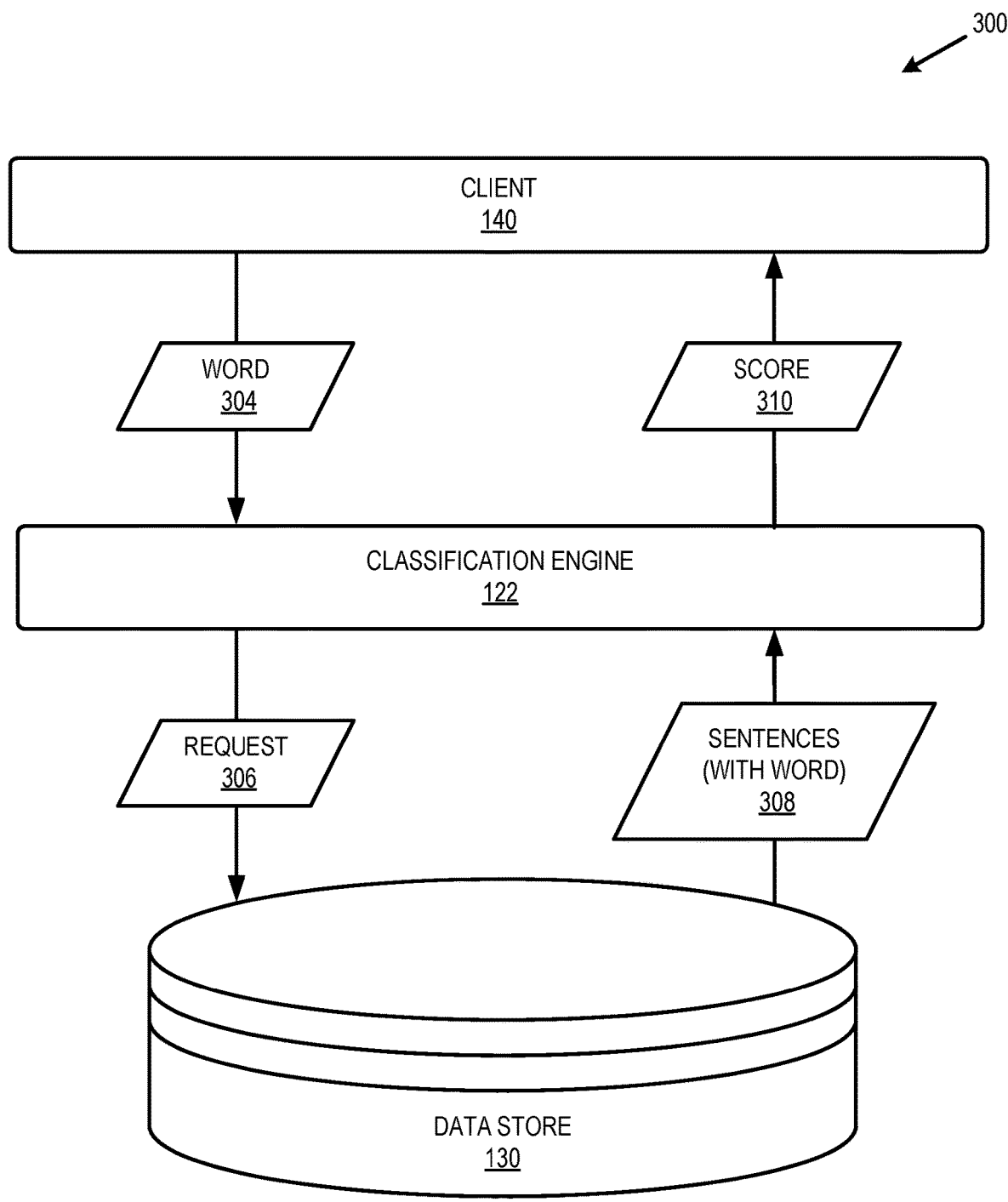
FIG. 3 depicts an exchange of data between components related to using a classifier to determine a measure of similarity between a word and a class according to embodiments of the present disclosure.

FIG. 3 depicts an example 300 of an exchange of data between components related to using a classifier to determine a measure of similarity between a word and a class according to embodiments of the present disclosure.

Example 200 includes client 140, classification engine 122, and data store 130 of FIG. 1. Client 120 sends word 304 to classification engine 122, such as in a request to classify word 304 (e.g., via API 124 of FIG. 1). In one embodiment, client 140 receives word 304 as an input from a user, and initiates a process to classify word 304 to assist in determining how to respond to the user. Classification engine 122 receives word 304 from client 120 and sends a request 306 to data store 130 for one or more sentences that include word 304.

In response to request 306, data store 130 provides sentences 308 to classification engine 122. Each of sentences 308 includes word 304. Classification engine 122 determines a measure of correlation between word 304 and a particular class, such as by providing sentences 308 or features derived from sentences 308 as inputs to a trained classifier and receiving a measure of correlation as an output from the trained classifier. For example, the trained classifier may be classifier 230 of FIG. 2. Classification engine 122 provides score 210, which indicates a measure of correlation between word 304 and the class, to client 140. Client 140 may then use score 210 to perform additional processing, such as determining or filtering content to provide to the user or determining whether to transfer the user to a live support agent.

Figure 4:
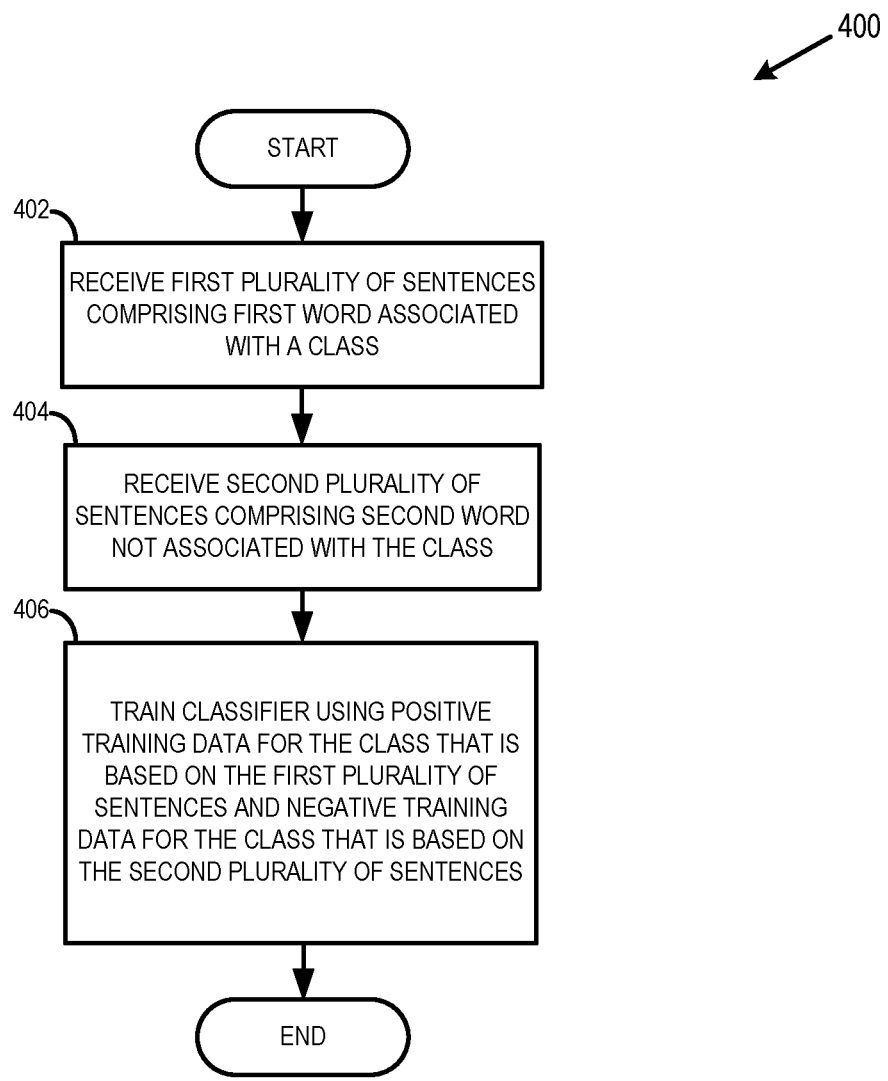
FIG. 4 depicts example operations for training a classifier according to embodiments of the present disclosure.

FIG. 4 depicts example operations 400 for training a classifier according to embodiments of the present disclosure. For example, operations 400 may be performed by classification engine 122 of FIG. 1.

At block 402, a first plurality of sentences comprising a first word associated with a class is received. For example, classification engine 122 may send a request to data store 130 of FIG. 1 for sentences containing the first word, and data store 130 may send the first plurality of sentences to classification engine 122 in response.

At block 404, a second plurality of sentences comprising a second word that is not associated with the class is received. For example, classification engine 122 may send a request to data store 130 of FIG. 1 for sentences containing the second word, and data store 130 may send the second plurality of sentences to classification engine 122 in response.

At block 406, a classifier is trained for the class using a positive training data set that is based on the first plurality of sentences and a negative training data set that is based on the second plurality of sentences. For example, classification engine 122 may perform lexical analysis on the first plurality of sentences to determine features to use as positive training data and on the second plurality of sentences to determine features to use as negative training data, and may train the classifier accordingly. The classifier may be associated with one or more particular psycholinguistic classes, such as abstractness, concreteness, controversy, sentiment, or factuality.

Figure 5:
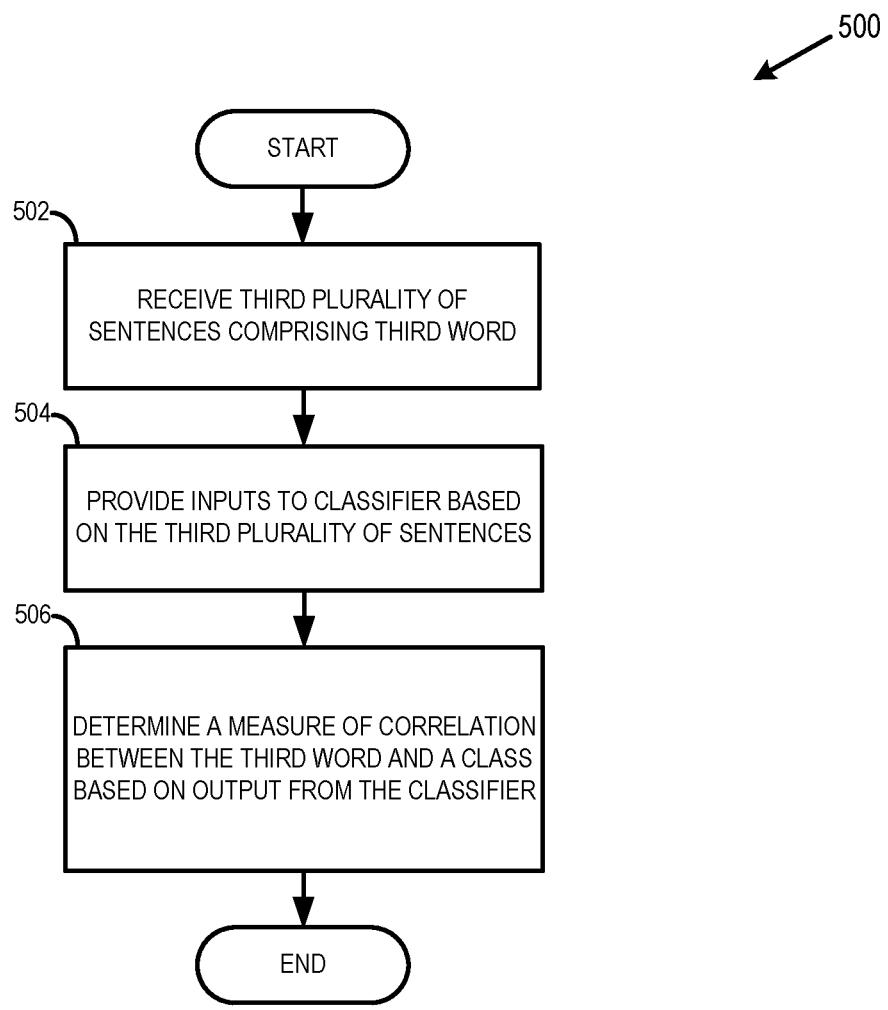
FIG. 5 depicts example operations for using a classifier to determine a measure of similarity between a word and a class according to embodiments of the present disclosure.

FIG. 5 depicts example operations 500 for using a classifier to determine a measure of similarity between a word and a class according to embodiments of the present disclosure. Operations 500 may, for example, be performed by classification engine 122 of FIG. 1 after operations 400 of FIG. 4 are performed to train the classifier.

At block 502, a third plurality of sentences comprising a third word is received. For example, classification engine 122 may receive a request from client 140 of FIG. 1 (e.g., based on user input) to determine a measure of correlation between the third word and a particular class, and may request sentences containing the third word from data store 130. In response, data store 130 may send the third plurality of sentences to classification engine 122.

At block 504, classification engine 122 provides input to a classifier based on the third plurality of sentences. In one example, classification engine 122 performs lexical analysis of the third plurality of sentences to determine features that are provided as inputs to the classifier, which has been trained using operations 400 of FIG. 4.

At block 506, classification engine 122 determines a measure of correlation between the third word and the particular class based on output from the classifier. For example, the classifier may output a score that indicates a measure of correlation between the input features and the class, and classification engine 122 may use the score as a measure of correlation between the third word and the class (e.g., because the input features are associated with the third word).

While not depicted in FIG. 5, the measure of correlation may be used for a variety of purposes. In certain embodiments, the measure of correlation is provided to a client device (e.g., client 140 of FIG. 1), which may use the measure of correlation to perform additional processing. For instance, the client device may use the measure of correlation to determine content to provide to a user.

Figure 6:
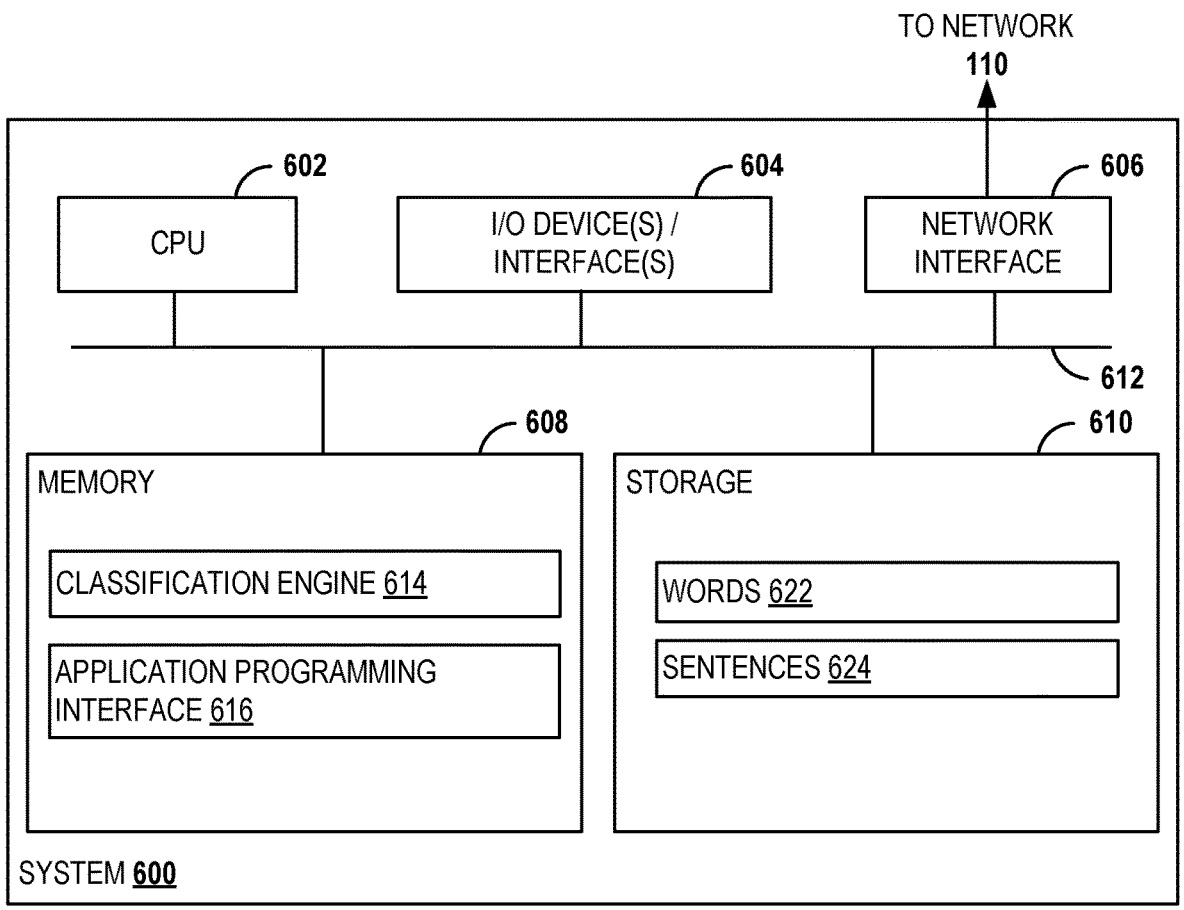
FIG. 6 depicts a computing system with which embodiments of the present disclosure may be implemented.

FIG. 6 depicts a computing system 600 with which embodiments of the present disclosure may be implemented. For example, computing system 600 may represent server 120 of FIG. 1.

System 600 includes a central processing unit (CPU) 602, one or more I/O device interfaces 604 (that may provide connections for various I/O devices 614, such as keyboards, displays, mouse devices, and the like) to the system 600, network interface 606 (e.g., a physical network interface card), memory 608, storage 610, and an interconnect 612. It is noted that one or more components of system 600 may alternatively be located remotely and accessed via a network, such as network 110. It is further contemplated that one or more components of system 600 may comprise physical or virtualized components.

CPU 602 may receive and execute instructions stored in memory 608. Similarly, the CPU 602 may receive and store data related to applications in memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 may represent a random access memory. Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises words 622 and sentences 624. For example, words 622 may be words received with requests from client 140 of FIG. 1. Sentences 624 may be sentences received from data store 130 of FIG. 1, and may be used by classification engine 614 to train and use a classifier according to embodiments of the present disclosure.

As shown, memory 608 includes classification engine 614 and API 616, which may be representative of classification engine 122 and API 124 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a classification engine, as described herein) or related data available in the cloud. For example, the classification engine could execute on a computing system in the cloud and a client device could interact with the classification engine via an API in order to request classifications of words or phrases. In such a case, the classification engine could use a classifier to generate measures of correlation between words or phrases and classes, and could store the measurements of correlation at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a first plurality of sentences comprising a first word that is associated with a class and a second plurality of sentences comprising a second word that is not associated with the class;

training a classifier using positive training data for the class that is based on the first plurality of sentences and negative training data for the class that is based on the second plurality of sentences;

determining a measure of correlation between a third word and the class by using a sentence comprising the third word as an input to the classifier; and using the measure of correlation to perform an action selected from a group comprising:
selecting content to provide to a user;
determining an automatic chat response; or
filtering a set of content.

2. The method of claim 1, wherein training the classifier comprises identifying a context of the first word in the first plurality of sentences and a context of the second word in the second plurality of sentences.

3. The method of claim 2, wherein identifying the context of the first word in the first plurality of sentences and the context of the second word in the second plurality of sentences comprises identifying words near the first word in the first plurality of sentences and identifying words near the second word in the second plurality of sentences.

4. The method of claim 1, wherein the positive training data comprises one or more of the following: a word; a phrase; a prefix; or a suffix.

5. The method of claim 1, wherein the classifier comprises one of: a nearest neighbor algorithm; or a Nave Bayes algorithm.

6. The method of claim 1, wherein selecting the content to provide to the user comprises identifying anecdotal content based on the measure of correlation.

7. The method of claim 1, wherein determining the automatic chat response comprises:
determining a difficulty of a problem based on the measure of correlation; and
choosing whether to escalate the problem to a live support agent based on the difficulty of the problem.

8. The method of claim 1, wherein the class comprises words defined as being abstract.

9. The method of claim 1, wherein training the classifier comprises filtering out non-alphabetic words and special characters from the first plurality of sentences and the second plurality of sentences.

10. The method of claim 1, wherein the classifier is associated with one or more particular psycholinguistic classes.

11. A system, comprising: one or more processors; and a non-transitory computer-readable medium storing instructions that, when executed by the one or more processors, cause the one or more processors to perform a method, the method comprising:
receiving a first plurality of sentences comprising a first word that is associated with a class and a second plurality of sentences comprising a second word that is not associated with the class;
training a classifier using positive training data for the class that is based on the first plurality of sentences and negative training data for the class that is based on the second plurality of sentences;
determining a measure of correlation between a third word and the class by using a sentence comprising the third word as an input to the classifier; and
using the measure of correlation to perform an action selected from a group comprising:
selecting content to provide to a user;
determining an automatic chat response; or
filtering a set of content.

12. The system of claim 11, wherein training the classifier comprises identifying a context of the first word in the first plurality of sentences and a context of the second word in the second plurality of sentences.

13. The system of claim 12, wherein identifying the context of the first word in the first plurality of sentences and the context of the second word in the second plurality of sentences comprises identifying words near the first word in the first plurality of sentences and identifying words near the second word in the second plurality of sentences.

14. The system of claim 11, wherein the positive training data comprises one or more of the following: a word; a phrase; a prefix; or a suffix.

15. The system of claim 11, wherein the classifier comprises one of: a nearest neighbor algorithm; or a Nave Bayes algorithm.

16. The system of claim 11, wherein selecting the content to provide to the user comprises identifying anecdotal content based on the measure of correlation.

17. The system of claim 11, wherein determining the automatic chat response comprises:
determining a difficulty of a problem based on the measure of correlation; and
choosing whether to escalate the problem to a live support agent based on the difficulty of the problem.

18. The system of claim 11, wherein the class comprises words defined as being abstract.

19. The system of claim 11, wherein training the classifier comprises filtering out non-alphabetic words and special characters from the first plurality of sentences and the second plurality of sentences.

20. A non-transitory computer-readable storage medium having computer-readable program code embodied therewith, the computer-readable program code executable by one or more computer processors to perform a method, the method comprising:
receiving a first plurality of sentences comprising a first word that is associated with a class and a second plurality of sentences comprising a second word that is not associated with the class;
training a classifier using positive training data for the class that is based on the first plurality of sentences and negative training data for the class that is based on the second plurality of sentences;
determining a measure of correlation between a third word and the class by using a sentence comprising the third word as an input to the classifier; and
using the measure of correlation to perform an action selected from a group comprising:
selecting content to provide to a user;
determining an automatic chat response; or
filtering a set of content.

* * * * *